(12) United States Patent
Starsinic

(10) Patent No.: US 6,172,153 B1
(45) Date of Patent: Jan. 9, 2001

(54) OLEFIN POLYMER COMPOSITION HAVING LOW SMOKE GENERATION AND FIBER, FILM AND FABRIC PREPARED THEREFROM

(75) Inventor: Michael E. Starsinic, Elkton, MD (US)

(73) Assignee: Montell North America Inc., Wilmington, DE (US)

(*) Notice: Under 35 U.S.C. 154(b), the term of this patent shall be extended for 0 days.

(21) Appl. No.: 09/097,281

(22) Filed: Jun. 12, 1998

(51) Int. Cl.$^7$ ............... C08J 5/10; C08K 5/04; C08K 5/09; C08L 23/00
(52) U.S. Cl. ............ 524/400; 524/119; 524/236; 524/301; 524/318; 524/128; 524/100; 524/444; 524/432; 524/451; 524/433; 524/436
(58) Field of Search ............... 524/119, 236, 524/444, 451, 432, 433, 436, 301, 318, 400, 128, 100; 264/331.15

(56) References Cited

U.S. PATENT DOCUMENTS

| | | | |
|---|---|---|---|
| 3,302,454 | 2/1967 | Kleesattel | 73/67.1 |
| 3,338,992 | 8/1967 | Kinney | 264/24 |
| 3,341,394 | 9/1967 | Kinney | 161/72 |
| 3,502,763 | 3/1970 | Hartmann | 264/210 |
| 3,542,615 | 11/1970 | Dobo et al. | 156/181 |
| 3,692,618 | 9/1972 | Dorschner et al. | 161/72 |
| 3,802,817 | 4/1974 | Matsuki et al. | 425/66 |
| 3,849,241 | 11/1974 | Butin et al. | 161/169 |
| 4,251,407 * | 2/1981 | Schroeder et al. | 260/23 R |
| 4,318,845 | 3/1982 | Spivack et al. | 524/91 |
| 4,340,563 | 7/1982 | Appel et al. | 264/518 |
| 4,668,721 | 5/1987 | Seltzer et al. | 524/95 |
| 4,876,300 | 10/1989 | Seltzer et al. | 524/100 |
| 5,141,772 | 8/1992 | Chatterjee | 427/213 |
| 5,212,246 | 5/1993 | Ogale | 525/240 |
| 5,236,962 | 8/1993 | Govoni et al. | 521/56 |
| 5,276,076 | 1/1994 | Pastor et al. | 524/119 |
| 5,326,802 | 7/1994 | Pastor et al. | 524/119 |
| 5,331,031 | 7/1994 | Pastor et al. | 524/119 |
| 5,405,893 | 4/1995 | Pastor et al. | 524/119 |
| 5,409,992 | 4/1995 | Eppert, Jr. | 525/88 |
| 5,414,034 * | 5/1995 | Enlow et al. | 524/120 |
| 5,486,419 | 1/1996 | Clementini et al. | 428/397 |
| 5,667,562 | 9/1997 | Midkiff | 96/15 |
| 5,834,541 * | 11/1998 | Becker et al. | 524/119 |

FOREIGN PATENT DOCUMENTS

| | | |
|---|---|---|
| 0 875 530 A1 | 11/1998 | (EP) . |
| WO 94/24344 | 10/1994 | (WO) . |
| 95/25767 | 9/1995 | (WO) . |

* cited by examiner

Primary Examiner—Samuel A. Acquah
Assistant Examiner—U. K. Rajguru

(57) ABSTRACT

A polymer composition and fiber, film and fabric prepared therefrom. The composition contains (i) an acid neutralizing agent other than a metallic salt of a saturated or unsaturated fatty acid, (ii) a processing aid comprising a metallic salt of a saturated or unsaturated fatty acid, the metallic salt of a saturated or unsaturated being present in a maximum amount of 200 ppm, a stabilizer system containing (a) a phosphite selected from the group consisting of 2,2',2"-nitrilo[triethyl-tris(3,3',5,5'-tetra-tert.butyl-1, 1-biphenyl-2, 2'-diyl)phosphite] and tris(2,4-di-tert-butylphenyl) phosphite; and (b) a N,N-dialkylhydroxylamine. Also disclosed is a method for preparing a polyolefin fiber, film or fabric which includes (A) incorporating the above additives into an olefin polymer, thereby producing a stabilized polyolefin polymer; and (B) extruding the stabilized olefin polymer through a die, thereby producing a olefin polymer fiber or film. A woven or non-woven fabric may be prepared from the olefin polymer fiber or film.

24 Claims, No Drawings

OLEFIN POLYMER COMPOSITION HAVING LOW SMOKE GENERATION AND FIBER, FILM AND FABRIC PREPARED THEREFROM

BACKGROUND OF THE INVENTION

Olefin polymers, especially polypropylene, are commonly spun into fibers, film or sheet by extruding molten polymer through die orifices such as a spinnerette, film or sheet dies, quenching the molten filament, film or sheet, orienting the filament, film or sheet, and heat setting the oriented filament, film or sheet prior to winding upon a bobbin. Woven and non-woven fabrics are commonly made from such filament, film or sheet.

A problem associated with polyolefins produced using Ziegler-Natta type catalysts is the generation of visible "smoke" during melt extrusion of polyolefin during fiber spinning and film extrusion operations. The "smoke" evolves at the die, and is believed to comprise volatile organic compounds in the 20–50 carbon atom range. These evolved volatile organic compounds subsequently condense and coat equipment with resultant problems of non-uniformity of nonwoven fabrics formed from such fibers or of films due to die deposits caused by the volatile organic compounds. Efforts to reduce or eliminate smoke have been partially successful at best. Minimizing both melt temperature and extruder residence time below certin levels can create processing problems. Devolatizing the polymer feedstock by heating prior to extrusion can reduce smoke generation by about 20% In contrast, the present invention can reduce smoke by up to 86% percent or more.

The incorporation of various additives into and/or onto olefin polymer materials to improve thermal stability, UV resistance, and processability is known. For example, the inclusion of an acid neutralizing agent in olefin polymer compositions is necessary due to small amounts of catalyst residues contained within the olefin polymer. These catalyst residues can cause corrosion of processing equipment such as mold surfaces and die lips. The addition of an appropriate acid neutralizing agent can eliminate or at least reduce the potential for corrosion due to such residues.

The selection of acid neutralizing agent is important because it can affect the overall acidity/basicity of an olefin polymer composition and can influence the reactions of many of the organic additives in the polymer composition. In addition, the polyolefin's release properties can be affected by the acid neutralizing agent.

In practice, metallic stearates such as sodium, calcium and zinc are commonly added to olefin polymer materials as an acid neutralizing agent, with calcium stearate being the most common. Calcium stearate is predominately used because it also functions as an external lubricant and processing aid in addition to acting as an acid neutralizing agent. Generally, it is necessary to add the calcium stearate in an amount of at least 500 ppm to ensure that it can function as an effective acid neutralizing agent.

Phosphite compounds, including 2,2',2''-nitrilo[triethyl-tris(3,3',5,5'-tetra-tert.butyl-1,1-biphenyl-2,2'-diyl) phosphite] are typically added to polyolefin compositions to stabilize them against thermal and oxidative degradation. Various forms of 2,2',2''-nitrilo[triethyl-tris(3,3',5,5'-tetra-tert.butyl-1,1-biphenyl-2,2'-diyl)phosphite] are known. For example, U.S. Pat. No. 5,326,802 discloses a beta crystalline modification of 2,2',2''-nitrilo[triethyl-tris(3,3',5,5'-tetra-tert.butyl-1,1-biphenyl-2,2'-diyl)phosphite]. Example 6 discloses the stabilization of polypropylene which also contains 750 ppm calcium stearate. U.S. Pat. Nos. 5,331,031 and 5,405,893 disclose a gamma crystalline modification of 2,2',2''-nitrilo[triethyl-tris(3,3',5,5'-tetra-tert.butyl-1,1-biphenyl-2,2'-diyl)phosphite]. Example 4 illustrates the stabilization of polypropylene which also contains 750 ppm calcium stearate. An amorphous solid modification of 2,2',2''-nitrilo[triethyl-tris(3,3',5,5'-tetra-tert.butyl-1,1-biphenyl-2,2'-diyl)phosphite] is disclosed by U.S. Pat. No. 5,276,076. Example 3 illustrates the stabilization of polypropylene which also contains 750 ppm calcium stearate.

The use of N,N-dialkylhydroxylamines to stabilize polyolefins is also known. Thus, U.S. Pat. No. 4,668,721 discloses that hydroxylamine derivatives may be used to stabilize polyolefin compositions against degradation due to extrusion, exposure to the combustion products of natural gas, gamma radiation or upon storage. The hydroxylamine derivative may have a chemical structure which conforms to one of fourteen structural formulae. In Example 21, a combination of hydroxylamine and calcium stearate (1000 ppm) is said to be far superior to hydroxylamine alone with respect to the yellowing resistance of polypropylene processed at 260° C.

U.S. Pat. No. 4,876,300 discloses that long chain N,N-dialkylhydroxylamines can be used as process stabilizers for polyolefin compositions in order to minimize discoloration and melt flow rate increase due to extrusion. Examples 16–18 and 20 illustrate the process stabilization of polypropylene which contains 1000 ppm calcium stearate, while Example 19 illustrates the process stabilization of polypropylene containing 1000 ppm zinc stearate.

International Patent Publication No. WO 94/24344 discloses a polypropylene stabilized with an effective amount of a selected hindered amine, a selected N,N-dialkylhydroxylamine, and a phosphite which may be 2,2',2''-nitrilo[triethyl-tris(3,3',5,5'-tetra-tert.butyl-1,1-biphenyl-2,2'-diyl)]phosphite. The polypropylene composition is free or essentially free of any traditionally used phenolic antioxidant, and is said to possess enhanced light stability, enhanced long term heat stability and especially enhanced gas fade stability. All of the formulations disclosed in the examples contain 750 ppm calcium stearate.

An object of the invention is to provide a stabilized olefin polymer composition which exhibits good processing characteristics and yet which generates a minimum amount of smoke during extrusion into a fiber or film.

Yet another object of the invention is to provide a method for reducing volatile organic compounds generated during polyolefin fiber and film production by up to 86 percent.

BRIEF SUMMARY OF THE INVENTION

In one aspect, the present invention relates to a polymer composition comprising an olefin polymer containing
   (i) an acid neutralizing agent other than a metallic salt of a saturated or unsaturated fatty acid,
   (ii) a processing aid comprising a metallic salt of a saturated or unsaturated fatty acid, the metallic salt of a saturated or unsaturated being present in a maximum amount of 200 ppm,
   (iii) a stabilizer system comprising
      (a) a phosphite selected from the group consisting of 2,2',2''-nitrilo[triethyl-tris(3,3',5,5'-tetra-tert.butyl-1,1-biphenyl-2,2'-diyl)phosphite] and tris(2,4-di-tert-butylphenyl phosphite; and
      (b) a N,N-dialkylhydroxylamine.

In another aspect, the present invention relates to a method for preparing an olefin polymer fiber or film comprising
(A) incorporating the following additives into an olefin polymer:
  (i) an acid neutralizing agent other than a metallic salt of a saturated or unsaturated fatty acid,
  (ii) a processing aid comprising a metallic salt of a saturated or unsaturated fatty acid, the metallic salt of a saturated or unsaturated being present in a maximum amount of 200 ppm,
  (iii) a stabilizer system comprising
    (a) a phosphite selected from the group consisting of 2,2',2"-nitrilo[triethyl-tris(3,3',5,5'-tetra-tert.butyl-1,1 -biphenyl-2,2'-diyl)phosphite) and tris(2,4-di-tert-butylphenyl) phosphite; and
    (b) a N,N-dialkylhydroxylamine, thereby producing a stabilized polyolefin polymer; and
(B) extruding the stabilized olefin polymer through a die, thereby producing an olefin polymer fiber or film.

DETAILED DESCRIPTION OF THE PREFERRED EMBODIMENTS

It has unexpectedly been discovered that it is possible to provide a stabilized olefin polymer composition which exhibits good processing characteristics and yet which generates a minimum amount of smoke during extrusion into a fiber or film. This combination of desirable properties is exhibited by careful tailoring of the polyolefin composition. First, the present invention employs an acid neutralizing agent other than a metallic salt of a saturated or unsaturated fatty acid. Second, the inventive composition contains an unconventionally low amount of calcium stearate which, by itself is ineffective to function as an acid neutralizer, but which is an effective processing agent. Third, a stabilizer system comprising selected phosphites and a hydroxylamine acts to reduce the smoke generated by the presence of the calcium stearate. The resulting composition has acceptable processing characteristics typical of polyolefins containing conventional amounts of calcium stearate, while producing significantly less smoke during extrusion into fiber or film than polyolefin compositions containing conventional amounts of calcium stearate.

Controlled rheology olefin polymers are prepared by polymerizing olefin monomers to a relatively high weight average molecular weight, which are then treated ("visbroken") with peroxide to reduce their molecular weight to a desired average. Alternately, controlled rheology polymers can be prepared by employing a Ziegler-Natta catalyst system known to provide the desired weight average molecular weight and by using a sufficient amount of chain transfer agent, such as hydrogen, during the polymerization to achieve the desired melt flow rate.

The olefin polymer is derived by polymerizing at least one mono-α-olefin, such as ethylene, propylene, isobutylene, butene-1, 3-methyl-1-butene and 4-methyl-1-pentene. Polyethylene, both homopolymer and copolymer, may be for example medium density, high density or linear low density polyethylene.

Copolymers of mono-α-olefins may also be used in the instant compositions, for example ethylene/propylene copolymers, propylene/butene-1 copolymers, propylene (octene-1 copolymers, ethylene/butene-1 copolymers, ethylene/octene-1 copolymers as well as ethylene/vinyl acetate copolymers.

Heterophasic or impact modified olefin polymers may also be used in the compositions of this invention. Suitable heterophasic olefin polymers include a) an olefin polymer composition comprising:
  (i) about 10 parts to about 60 parts by weight of a crystalline propylene homopolymer having an isotactic index greater than 80, or a crystalline copolymer selected from the group consisting of (a) propylene and ethylene, (b) propylene, ethylene and a $C_4$–$C_8$ α-olefin, and (c) propylene and a C4–$C_8$ α-olefin, the copolymer having a propylene content of more than 85% by weight and an isotactic index greater than 85;
  (ii) about 5 parts to about 25 parts by weight of a copolymer of ethylene and propylene or a C4–$C_8$ α-olefin that is insoluble in xylene at ambient temperature; and
  (iii) about 30 parts to about 70 parts by weight of an elastomeric copolymer selected from the group consisting of (a) ethylene and propylene, (b) ethylene, propylene, and a $C_4$–$C_8$ α-olefin, and (c) ethylene and a $C_4$–$C_8$ α-olefin, the copolymer optionally containing about 0.5% to about 10% by weight of a diene, and containing less than 70% by weight of ethylene and being soluble in xylene at ambient temperature and having an intrinsic viscosity of about 1.5 to about 4.0 dl/g in tetrahydronaphthalene at 135° C;
the total of (ii) and (iii), based on the total olefin polymer composition being from about 50% to about 90%, and the weight ratio of (ii)/(iii) being less than 0.4, wherein the composition is prepared by polymerization in at least two stages and has a flexural modulus of less than 150 mPa;
(b) an olefin polymer comprising:
  (i) about 10% to about 60% of a propylene homopolymer having an isotactic index greater than 80, or a crystalline copolymer selected from the group consisting of (a) ethylene and propylene, (b) ethylene, propylene and a $C_4$–$C_8$ α-olefin, and (c) ethylene and a $C_4$–$C_8$ α-olefin, the copolymer having a propylene content greater than 85% and an isotactic index greater than 85%;
  (ii) about 20% to about 60% of an amorphous copolymer selected from the group consisting of (a) ethylene and propylene, (b) ethylene, propylene, and a $C_4$–$C_8$ α-olefin, and (c) ethylene and a $C_4$–$C_8$ α-olefin, the copolymer optionally containing about 0.5% to about 10% of a diene and containing less than 70% ethylene and being soluble in xylene at ambient temperature; and
  (ii) about 3% to about 40% of a copolymer of ethylene and propylene or a C4–$C_8$ α-olefin that is insoluble in xylene at ambient temperature;
wherein the composition has a flexural modulus of greater than 150 but less than 1200 mPa, preferably 200 to 1100 mPa, most preferably 200 to 1000 mPa, measured at 23° C., a frequency measure of 1 Hz and a scning temperature of 2° C./min.; and
(c) an olefin polymer composition comprising:
  (i) about 30% to about 98% of a polymeric material selected from the group consisting of a polypropylene homopolymer having an isotactic index greater than 90, and a crystalline copolymer having an isotactic index greater than 85 of propylene and at least one α-olefin of the formula $CH_2$=CHR, where R is H or a $C_2$–$C_6$ alkyl group, the α-olefin being less than 10% of the copolymer when R is H and being less than 20% when R is a $C_2$–$C_6$ alkyl group or a combination thereof with R=H, and
  (ii) about 2% to about 70% of an elastomeric copolymer of propylene and an α-olefin of the formula $CH_2=CHR$, where R is H or a $C_2-C_8$ alkyl group, the α-olefin being about 45% to about 75% of the elastomeric copolymer, and about 10% to about 40% of the elastomeric copolymer being insoluble in xylene at ambient temperature, or an elastomeric copolymer of ethylene and a $C_4-C_8$ α-olefin having an α-olefin content of about 15% to about 60%.

As used herein, room or ambient temperature is approximately 25° C.

The total amount of polymerized ethylene in (a) is preferably about 10 to about 40% by weight.

The $C_{4-8}$ α-olefins useful in the preparation of (a) and (b) include, for example, butene-1; pentene-1; hexene-1; 4-methyl-1-pentene, and octene-1.

The diene, when present, is typically a butadiene, 1,4-hexadiene; 1,5-hexadiene, or ethylidenenorbornene.

Propylene polymer materials (a) and (b) can be prepared by polymerization in at least two stages, where in the first stage the propylene, or propylene and ethylene or an α-olefin, or propylene, ethylene and an α-olefin are polymerized to form component (i) of (a) or (b), and in the following stages the mixtures of ethylene and propylene or the α-olefin, or ethylene, propylene and the α-olefin, and optionally a diene, are polymerized to form components (ii) and (iii) of (a) and (b).

The polymerization of (a) and (b) can be conducted in liquid phase, gas phase, or liquid-gas phase using separate reactors, all of which can be done either by batch or continuously. For example, it is possible to carry out the polymerization of component (i) using liquid propylene as a diluent, and the polymerization of components (ii) and (iii) in gas phase, without intermediate stages except for the partial degassing of the propylene. All gas phase is the preferred method.

The preparation of propylene polymer material (a) is described in more detail in U.S. Pat. Nos. 5,212,246 and 5,409,992, which are incorporated herein by reference. The preparation of propylene polymer material (b) is described in more detail in U.S. Pat. Nos. 3,302,454 and 5,409,992, which are also incorporated herein by reference.

The polymer composition (c) can be obtained by sequential polymerization of monomers in the resence of Ziegler-Natta catalysts, or by mechanical blending of components (i) and (ii). Such a equential polymerization is described in more detail in U.S. Pat. No. 5,486,419, which is incorporated herein by reference.

The sequential polymerization can also be carried out with a mixture of Ziegler-Natta and metallocene catalysts or by using a Ziegler-Natta catalyst in one reactor, preferably the first reactor, and a metallocene catalyst in the other reactor(s), preferably the reactor(s) after the first reactor.

Mixtures of the homopolymers or mixtures of olefin copolymers or mixtures of both can be used.

The olefin polymer is preferably a crystalline propylene polymer, most preferably either a crystalline propylene homopolymer having an isotactic index greater than 90, most preferably greater than 93, or a crystalline, random copolymer of propylene and either ethylene or $C_4-C_{10}$ α-olefin with an isotactic index greater than 85. The propylene polymer is preferably visbroken to a melt flow rate ("MFR") of 15–50 g/10 minutes, most preferably 25–38 g/10 minutes, measured according to ASTM 1238, Condition L. Such propylene polymers are commercially available from Montell USA Inc.

The process of visbreaking a propylene polymer material is well known to those skilled in the art. Generally, it is performed as follows: propylene polymer in particulate form, e.g., "as polymerized" flake or pelletized, has sprayed thereon or blended therewith, a prodegradant or free radical generating source, e.g., a peroxide in liquid or powder form or absorbed on and/or in a carrier, e.g., polypropylene/peroxide concentrate. The propylene polymer and peroxide or propylene polymer/peroxide concentrate is then introduced into a means for thermally plasticizing or melt blending and conveying the mixture, e.g., an extruder at elevated temperature. Residence time and temperature are controlled in relation to the particular peroxide selected (i.e., based on the half-life of the peroxide at the process temperature of the extruder) so as to effect the desired degree of polymer chain degradation. The net result is to narrow the molecular weight distribution of the propylene polymer as well as to reduce the overall molecular weight and thereby increase the MFR relative to the as-polymerized propylene polymer. For example, a propylene polymer with a fractional MFR (i.e., less than 1), or a propylene polymer with a MFR of 0.5–10 g/10 minutes, can be selectively visbroken to a MFR of 15–50, preferably 25–38 g/10 minutes, by selection of peroxide type, extruder temperature and extruder residence time without undue experimentation. Sufficient care should be exercised in the practice of the procedure to avoid crosslinking in the presence of an ethylene-containing copolymer; typically, crosslinking will be avoided where the ethylene content of the copolymer is sufficiently low.

The polyolefin composition contains a processing aid comprising a metallic salt of a saturated or unsaturated fatty acid, which is present in a maximum amount of 200 ppm. Calcium stearate is preferred, and is preferably present in an amount of from 100 to 200 ppm, still more preferably in an amount of from 125 to 175 ppm.

The polymer composition of the present invention also contains an acid neutralizing agent other than a metal salt of a saturated or unsaturated fatty acid, particularly, metallic stearates and especially calcium stearate. Fatty acids typically have 4 to 22 carbon atoms with a terminal carboxyl group (COOH). Typical metals are those in Group 1A and IIA of the Periodic Table.

Suitable acid neutralizing compounds for use in the present invention include zeolite structures (hydrotalcite, both natural and synthetic), aluminum silicate, calcium carbonate, sodium benzoate and oxides and hydroxides of Group IA and IIA metals. Calcium lactate, calcium hydroxide, calcium oxide or mixtures thereof are most preferred. Hydrotalcite, which typically contains 3–10% by weight calcium stearate, based on the weight of hydrotalcite, may be employed if its calcium stearate contribution is taken into account in adjusting the amount of calcium stearate present in the polyolefin composition.

An effective amount of the acid neutralizing agent will range from 200 to 2000 ppm polymer, preferably 200 to 1,000 ppm polymer, depending on the acidity of the polyolefin and the equivalent weight of the acid neutralizing agent. In the case of polypropylene, a preferred amount of an acid neutralizing agent such as calcium lactate ranges from 200 to 300 ppm polymer.

The applicants do not wish to be bound by any theory of the invention. It is currently believed that the acid neutralizing agent may act alone or in concert with the unconventionally low amount of calcium stearate to neutralize acids present in the polymer. More particularly, the effective amount of the acid neutralizing agent may depend upon the equivalent weight of the specific acid neutralizing agent chosen together with the amount of calcium stearate processing aid present in the polymer.

Thus, the calcium stearate may possess a dual function by (1) serving as a processing agent and (2) acting in concert with the acid neutralizing agent to neutralize acids contained within the polymer composition. Importantly, the amount of calcium stearate, by itself, is insufficient to completely neutralize the acids present in the polymer composition.

The phosphite stabilizer can be either 2,2',2"-nitrilo[triethyl-tris(3,3',5,5'-tetra-tert.butyl-1,1-biphenyl-2,2'-diyl)phosphite] or tris(2,4-di-tert-butylphenyl) phosphite. Both of these compounds are commercially available. The preparation of 2,2',2"-nitriloftriethyl-tris(3,3',5,5'-tetra-tert.butyl-1-biphenyl-2,2'-diyl)phosphite] is disclosed in U.S. Pat. No. 4,318,845, the disclosure of which is incorporated herein by reference in its entirely.

The N,N-dialkylhydroxylamine must have a hydroxyl group bonded to the nitrogen atom, and preferably conforms to the formula:

$R_1R_2NOH$ herein $R_1$ and $R_2$ are independently $C_{1-36}$ alky, which is unsubstituted or substituted with hydroxyl. llustrative hydroxylamines which come within the above formula include N,N-distearylhydroxylamine and di(hydrogenated tallow)amine.

A typical di(hydrogenated tallow)amine has the following distribution of alkyl substituents:

| | $R_1R_2NH$ | |
|---|---|---|
| $R_1$ | $R_2$ | % |
| $C_{16}$ | $C_{14}$ | 1.9 |
| $C_{16}$ | $C_{16}$ | 12.4 |
| $C_{16}$ | $C_{17}$ | 2.8 |
| $C_{16}$ | $C_{18}$ | 36.0 |
| $C_{17}$ | $C_{18}$ | 3.9 |
| $C_{18}$ | $C_{18}$ | 39.0 |
| other | | 4.0 |

The di(hydrogenated tallow)amine originating from animal sources may well vary somewhat in the specific distribution of alkyl substituents, but the di(hydrogenated tallow) amine contains major amounts of N,N-dihexadecylamine, N,N-dioctadecylamine and N-hexadecyl-N-octadecylamine. The individual components of the mixture can be separated by distillation under high vacuum.

However, for the purposes of this invention, there is no need to cany out such separation and the hydroxylamine prepared from the di(hydrogenated tallow)amine is a preferred embodiment of the present invention.

The long chain N,N-dialkylhydroxylamines can be prepared by a number of methods. These include (a) the oxidation of the corresponding secondary amine with aqueous hydrogen peroxide to form the desired N,N-dialkylhydroxylamine directly; (b) the addition of the secondary amine to an alpha, beta-unsaturated compound such as an alkyl acrylate to form a Michael addition product, which is in turn oxidized to the corresponding tertiary amine oxide using aqueous hydrogen peroxide, and followed by the elimination of the alpha,beta-unsaturated compound by the Cope reaction to give the N,N-dialkylhydroxylamine; (c) the metathesis reaction between an alkyl halide and a hydroxylamine in the presence of alkali such as sodamide; and (d) the reaction of an amine with a peroxy compound, such as benzoyl peroxide, followed by saponification of the intermediate formed to the desired hydroxylamine derivative.

An effective amount of the stabilizer system will typically range from 250 to 2000 ppm polymer, with a preferred amount being 700 to 1500 ppm polymer. The stabilizer system may contain from 10 to 80% N,N-dialkylhydroxylamine and 90 to 20% phosphite.

The stabilizer system of the present invention may also contain at least one other stabilizer compound. For example, another phosphite compound may used in partial substitution of the primary phosphite stabilizer compounds for economic reasons. However, the inventor has discovered that such a substitution can only be partial (i.e., around 50%); full replacement of the primary phosphite compounds will significantly increase smoke generation. Suitable phosphite partial replacements include tris(2,4-di-tert-butylphenyl)phosphite and 2,4,6-tri-tert-butylphenyl-2-butyl-2-ethyl-1,3-propanediol phosphite.

The stabilizer system can also include conventional stabilizer compounds with little or no adverse affect on smoke generation. For example, a hindered amine light stabilizer (HALS) can be added to the stabilizer system. Suitable HALS include poly[6-[(1,1,3,3-tetramethyl-butyl)amino-s-triazine 2,4-yl]2,2,6,6-tetramethyl-4-piperindyl)imino] hexamethylene [(2,2,6,6,-tetramethyl-4-piperidyl)imino] and 1,3,5-triazine-2,4,6,-triamine-N,N"-[1,2-ethanedylbis[N-(3-[4,6-bis-(butyl-1,2,2,6,6-pentamethyl4-piperidinyl)amine]propyl-[N,N-dibutyl-N,N-bis(1,2,2,6,6-pentamethyl4-piperidinyl). Similarly, phenolic stabilizers such as tetrakis[methylene (3,5-di-tert.butyl-4-hydroxyhydrocinnamate)] methane and tetrakis [methylene 3-(3',5'-di-tert-butyl-4'-hydroxy-phenyl)propionate]methane may be added to increase thermal stability.

The stabilized polyolefin composition may contain other additives as appropriate for the intended use of the composition. Such additives include antistatic agents, flameproofing agents, antiblocking agents, lubricants, pigments, optical brighteners, nucleators and clarifiers.

The stabilizer system components may be incorporated into the olefin polymer in any conventional manner, such as by dry blending the stabilizer system directly with polymer pellets, by means of tumble mixers and Henschel blenders. Solutions, emulsions or slurries of the stabilizer system can be sprayed onto or admixed with granular polymer. For example, the stabilizer components can be coated upon granules of the olefin polymer in a fluidized bed according to the process of U.S. Pat. No. 5,141,772, the disclosure of which is incorporated herein in its entirety. The stabilizer components can also be blended with molten polymer by means of a Banbury mixer, Bradbender mixer, roll mill or screw extruder.

The stabilizer system can also be added to the olefin polymer in the form of a masterbatch according to the conventional techniques discussed in U.S. Pat. No. 5,236,962, the disclosure of which is incorporated by reference herein in its entirety.

The stabilized polyolefin composition of the present invention is particularly suitable for manufacture into a fiber or film using conventional techniques and apparatus. More particularly, the stabilized olefin polymer may be extruded at conventional temperatures (i.e., 210 to 280° C.) through a die, quenched, partially or fully oriented and heat-set prior to winding upon a bobbin or undergoing further processing into spunbonded or melt blown fiber, and ultimately into woven and non-woven webs.

As used herein the term "nonwoven web" means a web having a structure of individual fibers or threads which are interlaid, but not in an identifiable manner as in a knitted web. Nonwoven webs have been formed from many processes such as for example, meltblowing processes, spunbonding processes, and bonded carded web processes. The basis weight of nonwoven webs is usually expressed in ounces of material per square yard (osy) or grams per square meter (gsm) and the fiber diameters useful are usually expressed in microns.

As used herein the term "spunbonded fibers" refers to small diameter fibers which are formed by extruding molten thermoplastic material as filaments from a plurality of fine, usually circular capillaries of a spinneret with the diameter of the extruded filaments then being rapidly reduced as by, for example, in U.S. Pat. Nos. 4,340,563, 3,692,618, 3,802, 817, 3,338,992, 3,341,394, 3,502,763 and 3,542,615. Spunbond fibers are generally not tacky when they are deposited onto a collecting surface. Spunbond fibers are generally continuous and have average diameters (from a sample of at least 10) larger than 7 microns, more particularly, between about 10 and 20 microns.

As used herein the term "meltblown fibers" means fibers formed by extruding a molten thermoplastic material through a plurality of fine, usually circular, die capillaries as molten threads or filaments into converging high velocity, usually hot, gas (e.g., air) streams which attenuate the filaments of molten thermoplastic material to reduce their diameter, which may be to microfiber diameter. Thereafter, the meltblown fibers are carried by the high velocity gas stream and are deposited on a collecting surface to form a web of randomly dispersed meltblown fibers. Such a process is disclosed in U.S. Pat. No. 3,849,241. Meltblown fibers are microfibers which may be continuous or discontinuous, are generally smaller than 10 microns in average diameter, and are generally tacky when deposited onto a collecting surface. U.S. Pat. No. 5,667,562 discloses the production of filter media from polypropylene-based fibers using a spunbond process and is incorporated herein by reference.

A particularly preferred resin composition comprises 250 ppm calcium lactate as an acid neutralizing agent; 150 ppm calcium stearate as a processing aid; and the combination of 400 ppm 2,2',2"-nitrilo triethyl-tris(3,3',5,5'-tetra-tert.butyl-1,1-biphenyl-2,2-diyl)phosphite, 800 ppm N,N-di(stearyl) hydroxyl-amine; and 500 ppm tetrakis[methylene(3,5-di-tert.butyl-4-hydroxyhydro-cinnamate)]methane as a stabilizing agent.

EXAMPLES

These Examples are presented for the purpose of illustration only, and should not be construed to limit the nature or scope of the invention disclosed herein in any manner whatsoever.

The chemical identities of the products used in the formulations below are as follows:

Olefin Polymer

PF-305 polypropylene polymer commercially available from Montell USA Inc.

Phosphite Irgafos 12 2,2',2"-nitriloftriethyl-tris(3,3',5,5'-tetra-tert.butyl-1,1-biphenyl-2,2'-diyl)phosphite], commercially available from Ciba Specialty Chemicals Corporation.

Hydroxylamine

FS-042 N,N-di(stearyl)hydroxylamine, commercially available from Ciba Specialty Chemicals Corporation.

Hindered Phenolic Antioxidant

Irganox 1076 octadecyl-3,5-di-tert-butyl-4-hydroxy hydrocinnamate, commercially available from Ciba Specialty Chemicals Corporation.

Miscellaneous

Pationic 1240 calcium lactate, commercially available from American Ingredients Company.

DHT-4A hydrotalcite, commercially available from Kyowa Chemicals Industry Co., Ltd.

Example I

Three sample formulations were prepared based on a polypropylene feedstock prepared from a commercially produced polypropylene flake having an xylene soluble content at room temperature of 4.0% and an initial MFR of 1.5 g/10 minutes, measured according to ASTM 1238, Condition L, and visbroken to a target MFR of 38 g/10 minutes.

The sample formulations were then mixed together in a Kokneader extruder and pelletized. Smoke generation was measured by extruding 10 pound samples of each formulation at a rate of 10 pounds/hour at 260° C. through a 1.25" inch fiber extruder and quenching under moderate conditions. Volatile organic compounds were measured and recorded from evolved smoke aspirated from the die orifice via a vacuum system to a sample chamber where a laser particle counter measured the concentration of volatile particles in milligrams per cubic meter. Results were recorded on a strip chart recorder. The sample formulations and their smoke measurements are listed below:

TABLE 1

|  | PF-305 | I-1 | I-2 |
|---|---|---|---|
| Irganox 1076 (ppm) | 1,000 | 1,000 | 1,000 |
| Irgafos 12 (ppm) |  | 400 | 400 |
| FS-042 (ppm) |  | 800 | 800 |
| CaSt (ppm) | 500 | 500 | 150 |
| Pationic 1240 (ppm) |  |  | 200 |
| Irg. 12:FS-042 |  | 0.5 | 0.5 |
| Smoke (mg/cm) | 180 | 42 | 24 |

Examination of Table I illustrates the dramatic reduction in volatile organic compound generation exhibited by the present invention. More particularly, inventive sample I-2 achieved a 86% reduction in volatile organic compound generation in comparison. to control sample PF-305, which contains a conventional amount of calcium stearate and 1000 ppm hindered phenolic antioxidant, and a 42% reduction in comparison to control sample I-1, which contains a conventional amount of calcium stearate and the same stabilizer additives as the inventive formulation.

Other features, advantages and embodiments of the invention disclosed herein will be readily apparent to those exercising ordinary skill after reading the foregoing disclosures. In this regard, while specific embodiments of the invention have been described in considerable detail, variations and modifications of these embodiments can be affected without departing from the spirit and scope of the invention as described and claimed.

I claim:

1. A polymer composition comprising an olefin polymer containing:
   (i) an acid neutraliing agent other than a metallic salt of a saturated or unsaturated fatty acid,
   (ii) a processing aid comprising a metallic salt of a saturated or unsaturated fatty acid, said metallic salt of a saturated or unsaturated being present in an amount of from 100 to 200 ppm,
   (iii) a stabilizer system comprising:
      (a) a phosphite selected from the group consisting of 2,2',2"-nitrilo[triethyl-tris(3,3',5,5'-tetra-tert.butyl-1, 1-biphenyl-2,2'-diyl)phosphite] and tris(2,4-di-tert-butylphenyl) phosphite; and
      (b) a N,N-dialkylhydroxylamine.

2. The polymer composition of claim 1, wherein said acid neutralizing agent is at least one member selected from the group consisting of hydrotalcites, aluminum silicate, and oxides and hydroxides of Group II metals.

3. The polyolefin composition of claim 2, wherein said acid neutralizing agent is selected from the group consisting of calcium lactate, calcium hydroxide, calcium oxide and mixtures thereof.

4. The polyolefin composition of claim 1, wherein said processing aid comprises calcium stearate.

5. The polyolefin composition of claim 4, wherein said calcium stearate is present in an amount of from 125 to 175 ppm.

6. The polyolefin composition of claim 1, wherein said phosphite is 2,2',2"-nitrilo[triethyl-tris(3,3',5,5'-tetra-tert.butyl-1,1-biphenyl-2,2'-diyl)phosphite].

7. The polymer composition of claim 1, wherein said N,N-diallylhydroxylamine conforms to the formula:

$$R_1R_2NOH$$

wherein $R_1$ and $R_2$ are independently $C_{1-36}$ alkyl, which is unsubstituted or substituted with hydroxyl.

8. The polymer composition of claim 7, wherein said N,N-dialkylhydroxylamine is N,N-distearylhydroxylamine.

9. The polymer composition of claim 7, wherein said N,N-dialkylhydroxylamine comprises di(hydrogenated tallow) hydroxyl amine.

10. The polyolefin composition of claim 1, wherein said stabilizer system is present in an amount of 250 to 2000 ppm polymer.

11. The polyolefin composition of claim 10, wherein said stabilizer system is present in an amount of from 700 to 1500 ppm polymer.

12. The polyolefin composition of claim 1, wherein said stabilizer system comprises 10 to 80% N,N-dialkylhydroxylamine and 90 to 20% phosphite.

13. The polymer composition of claim 1, further comprising
(c) at least one other stabilizer compound, said other stabilizer comprising at least one member selected from the group consisting of a phenol, a hindered amine and a phosphite other than 2,2',2"-nitrilo[triethyl-tris(3,3', 5,5'-tetra-tert.butyl-1,1-biphenyl-2,2'-diyl)phosphite] or tris(2,4-di-tert-butylphenyl)phosphite.

14. The polyolefin composition of claim 13, wherein said other stabilizer compound is 2,4,6-tri-tert-butylphenyl-2-butyl-2-ethyl-1,3-propanediol phosphite.

15. The polyolefin composition of claim 13, wherein said other stabilizer compound is a hindered amine selected from the group consisting of poly[6-[(1,1,3,3-tetramethyl-butyl)amino-s-triazine 2,4-yl]2,2,6,6-tetramethyl-4-piperindyl)imino]hexamethylene [(2,2,6,6,-tetramethyl-4-piper-idyl)imino] and 1,3,5-triazine-2,4,6,-triamine-N,N"-[1,2-ethanedylbis[N-(3-[4,6-bis-(butyl-1,2,2,6,6,-pentamethyl-4-piperidinyl)amine]propyl-[N,N-dibutyl-N,N-bis(1,2,2,6,6-pentamethyl-4-piperidinyl).

16. The polyolefin composition of claim 13, wherein said other stabilizer compound is a phenol selected from the group consisting of tetrais[methylene(3,5-di-tert.butyl-4-hydroxyhydrocinnamate)] methane and tetrakis[methylene 3-(3',5'-di-tert-butyl-4'-hydroxy-phenyl) propionate)] methane.

17. The polymer composition of claim of claim 1, wherein said olefin polymer is either a crystalline propylene homopolymer having an isotactic index greater than 90 or a crystalline, random copolymer of propylene and either ethylene or a $C_4$–$C_{10}$ 1-olefin.

18. The polymer composition of claim 1, wherein said olefin polymer is a visbroken polypropylene having a melt flow rate of 15 to 50 g/10 minutes, measured according to ASTM 1238, Condition L.

19. The polymer composition of claim 18, wherein said melt flow rate is 25 to 38 g/10 minutes, measured according to ASTM 1238, Condition L.

20. A method for preparing a olefin polymer fiber or film, comprising:
(A) incorporating the following additives into an olefin polymer:
(i) an acid neutralizing agent other than a metallic salt of a saturated or unsaturated fatty acid,
(ii) a processing aid comprising a metallic salt of a saturated or unsaturated fatty acid, said metallic salt of a saturated or unsaturated being present in an amount of from 100 to 200 ppm,
(iii) a stabilizer system comprising:
(a) a phosphite selected from the group consisting of 2,2',2"-nitrilo[triethyl-tris(3,3',5,5'-tetra-tert.butyl-1,1-biphenyl-2,2'-diyl)phosphite] and tris(2,4-di-tert-butylphenyl) phosphite; and
(b) a N,N-dialkylhydroxylamine, thereby producing a stabilized polyolefin polymer, and
(B) extruding said stabilized olefin polymer through a die, thereby producing a olefin polymer fiber or film.

21. A fiber produced according to the process of claim 20.
22. A film produced according to the process of claim 20.
23. A fabric comprising a plurality of fibers of claim 21.
24. The fabric of claim 23, wherein said fabric is a non-woven fabric prepared using a spunbond or meltblown process.

* * * * *